United States Patent
Hewitt et al.

(10) Patent No.: US 11,577,592 B2
(45) Date of Patent: Feb. 14, 2023

(54) CONTINUOUS SEALING FLAT ASSEMBLY FOR UNIBODY TRUCK CARGO BOX

(71) Applicant: FORD GLOBAL TECHNOLOGIES, LLC, Dearborn, MI (US)

(72) Inventors: Daniel Hewitt, Amherstburg (CA); Srinath Vijayakumar, Farmington, MI (US); Amy Gombert, Canton, MI (US); Adam Hanes, Rockwood, MI (US); Patrick Roman, Oregon, OH (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 330 days.

(21) Appl. No.: 17/015,578

(22) Filed: Sep. 9, 2020

(65) Prior Publication Data
US 2022/0072940 A1 Mar. 10, 2022

(51) Int. Cl.
*B60J 7/16* (2006.01)

(52) U.S. Cl.
CPC .................. *B60J 7/1607* (2013.01)

(58) Field of Classification Search
CPC ... B60J 7/1607; B60J 7/16; B60J 7/102; B60J 7/10; B60P 7/04
USPC ............ 296/100.17, 100.18, 100.15, 190.08, 296/183.1, 180.3
See application file for complete search history.

(56) References Cited

U.S. PATENT DOCUMENTS

| | | | | |
|---|---|---|---|---|
| 4,647,103 A | * | 3/1987 | Walblay | B60P 7/04 296/100.18 |
| 4,850,769 A | * | 7/1989 | Matthews | B60P 7/0815 410/105 |
| 5,018,779 A | * | 5/1991 | Lund | B62D 35/007 296/180.1 |
| 5,971,469 A | * | 10/1999 | Lund | B60J 7/08 296/100.06 |
| 6,340,194 B1 | | 1/2002 | Muirhead et al. | |
| D514,997 S | * | 2/2006 | Hall | D12/196 |
| 7,014,400 B1 | * | 3/2006 | LaBelle | B60P 7/0815 410/104 |
| 7,316,445 B2 | * | 1/2008 | Sugimoto | B60J 7/10 296/213 |

(Continued)

FOREIGN PATENT DOCUMENTS

DE 102017006207 12/2017
WO 2014053863 4/2014

*Primary Examiner* — Joseph D. Pape
*Assistant Examiner* — Veronica M Shull
(74) *Attorney, Agent, or Firm* — Vichit Chea; Price Heneveld LLP

(57) ABSTRACT

A continuous sealing flat for a truck cargo box for a unibody motor vehicle includes a pair of parallel opposed top side rails and a cab back panel disposed between and orthogonally thereto. A central portion of the cab back panel has a central ledge having a substantially flat upper surface extending horizontally between each of the pair of parallel opposed top side rails. A pair of corner members is disposed over and proximate a forward end of each of the parallel opposed top side rails. A forward end of a horizontal portion of each of the pair of corner members comprises a flat upper surface proximate to and at substantially the same vertical height as a vertical height of the flat upper surface of the central ledge to form a substantially continuous corner flat upper surface.

20 Claims, 6 Drawing Sheets

(56) References Cited

U.S. PATENT DOCUMENTS

| | | | | |
|---|---|---|---|---|
| 7,506,913 | B2* | 3/2009 | Sugimoto | B60J 7/08 296/100.06 |
| 8,336,946 | B2* | 12/2012 | Schrader | B60J 7/102 296/100.18 |
| 2006/0108330 | A1* | 5/2006 | Lee | C21D 10/005 219/121.6 |
| 2006/0108331 | A1* | 5/2006 | Nozawa | H01J 37/32192 219/121.36 |
| 2018/0147926 | A1 | 5/2018 | Shi et al. | |

* cited by examiner

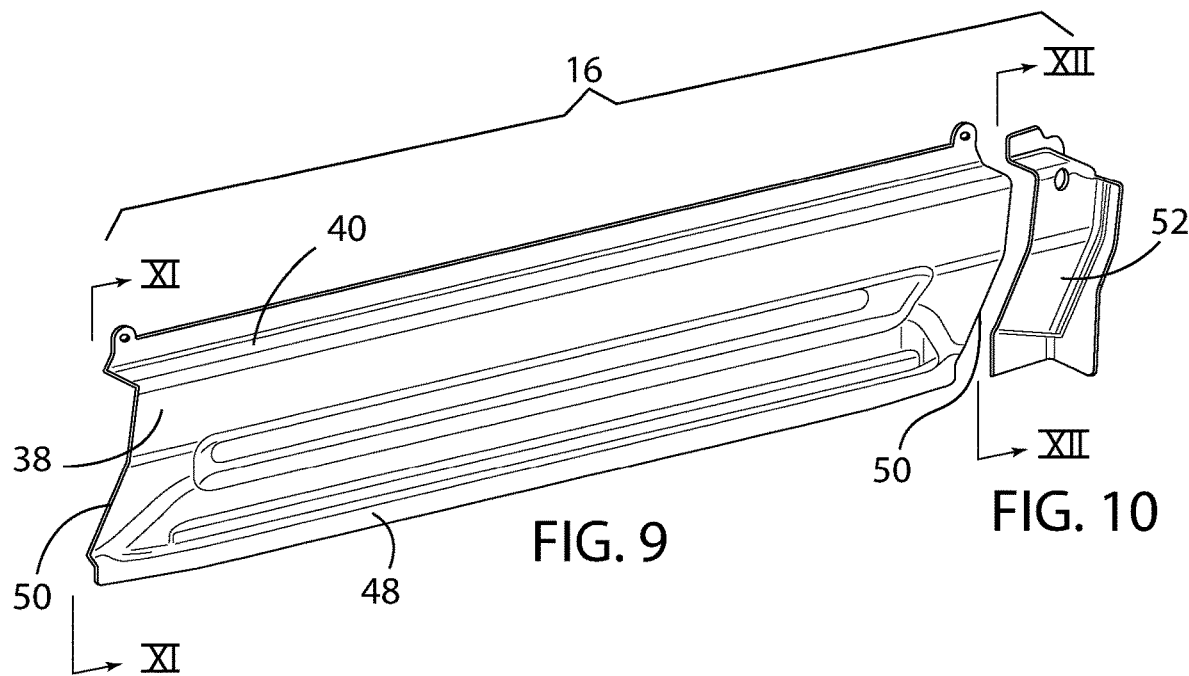
FIG. 9
FIG. 10
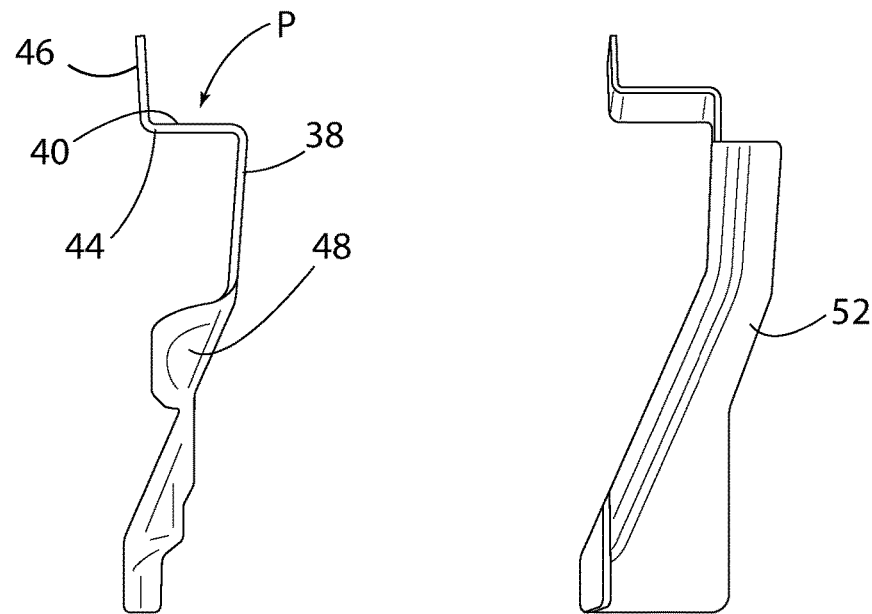
FIG. 11
FIG. 12

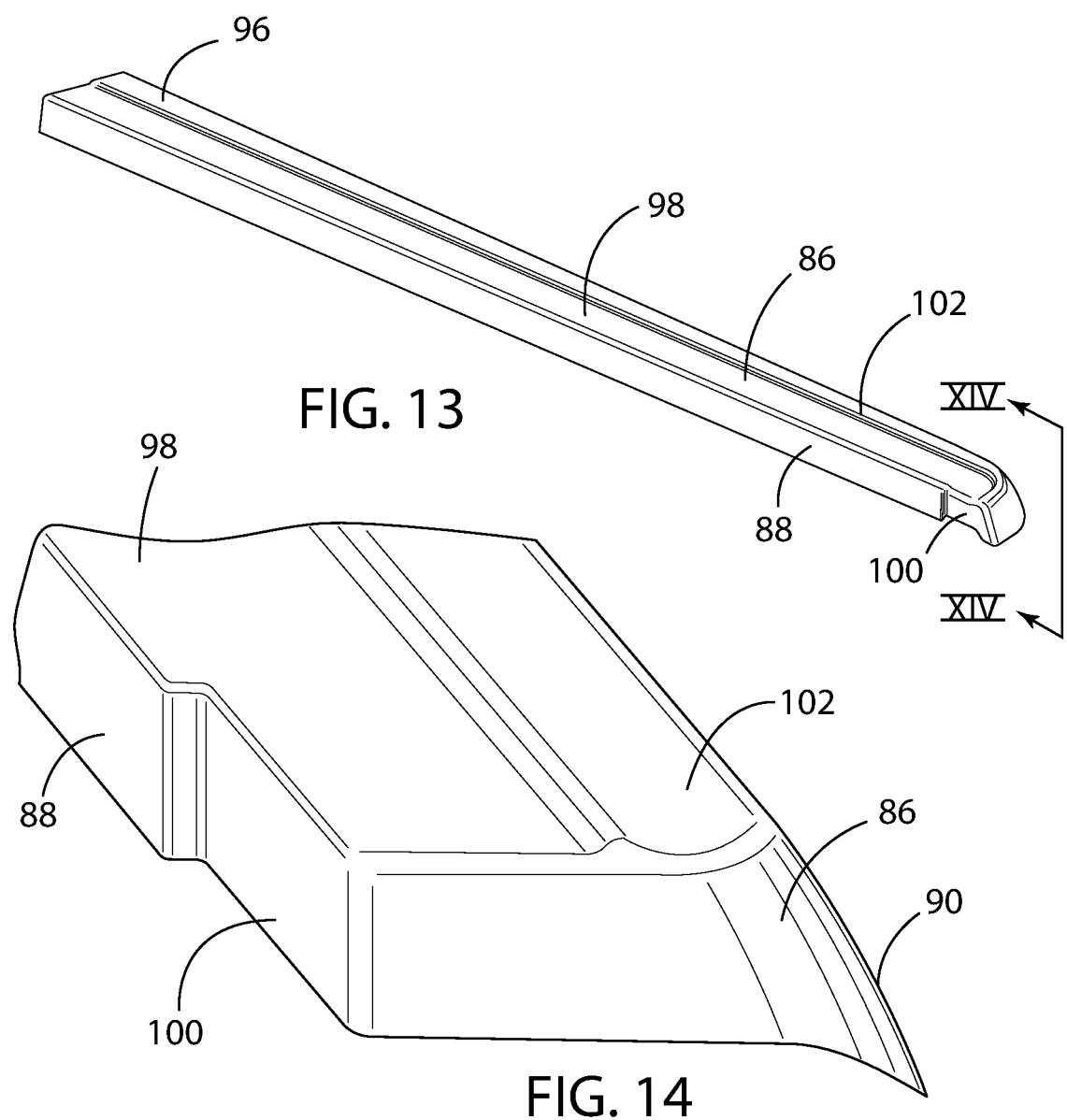

CONTINUOUS SEALING FLAT ASSEMBLY FOR UNIBODY TRUCK CARGO BOX

FIELD OF THE INVENTION

The present invention generally relates to an apparatus and method for improving the appearance and functionality of a motor vehicle and, more particularly, to a continuous sealing flat for a unibody motor vehicle equipped with a truck cargo box for installation of a tonneau cover.

BACKGROUND OF THE INVENTION

Traditional pickup trucks typically comprise a cab within which occupants may be seated and a truck cargo box located rearward of the cab within which cargo and other items may be transported. In the construction of such traditional pickup trucks, the cab and truck bed are often fabricated as separate assemblies separately mounted and affixed to a common chassis or frame. The truck cargo box typically includes a forward wall disposed proximate a rear back panel of the pickup truck cab, a pair of parallel opposed side walls, and a moveable tailgate pivotally attached at a rearward end. The rectangular truck cargo box thus formed may be provided with a top front rail disposed on the top of the forward wall, a pair of parallel opposed top side rails disposed on the top of the pair of parallel opposed side walls that, in combination with an upper surface of the moveable tailgate, form a continuous sealing flat or shelf around the perimeter of the truck cargo box. This continuous sealing flat provides a surface against which a cover for the truck bed, such as a tonneau cover, may be mounted and brought into sealing engagement to protect the truck cargo box and its contents from the elements.

However, with the trend toward unibody pickup trucks, where the truck bed is fabricated as an integrated structure with the cab, there is no top front rail readily disposed proximate the back panel of the pickup truck cab that is continuous with the pair of parallel opposed top side rails disposed on the top of the pair of parallel opposed side walls by which to create a continuous sealing flat around the perimeter of the truck cargo box. That is, the interface of the cab back panel of the pickup truck cab to the top of the pair of parallel opposed side walls typically results in a gap, which must be sealed by special measures. These special measures include installing a separate cargo box liner in the truck cargo box or bolting on separate rails to form a form a continuous sealing flat around the perimeter of the truck cargo box. However, this adds cost and additional assembly steps. Improvements were desired.

SUMMARY OF THE INVENTION

According to one aspect of the present invention, a continuous sealing flat for a truck cargo box for a unibody motor vehicle includes a pair of parallel opposed top side rails and a cab back panel disposed between and orthogonally to the pair of parallel opposed top side rails, wherein the cab back panel comprises a central portion having a central ledge having a substantially flat upper surface extending horizontally between an upper surface of each of the pair of parallel opposed top side rails. A pair of corner members each having a rearward end of a horizontal portion is disposed over and proximate a forward end of each of the parallel opposed top side rails. A forward end of the horizontal portion of each of the pair of corner members comprises a flat upper surface disposed proximate to and at substantially the same vertical height as a vertical height of the flat upper surface of the central ledge to form a substantially continuous corner flat upper surface.

Embodiments of the first aspect of the present disclosure can include any one or a combination of the following features:

- The flat upper surface of the central ledge has a forward edge and the flat upper surface of the forward end of the horizontal portion of each of the pair of corner members further comprises a forward edge disposed proximate the forward edge of the flat upper surface of the central ledge.
- The cab back panel further comprises a vertical lip extending upwardly from the forward edge of the flat upper surface of the central ledge and the forward edge of each of the pair of corner members and the forward edge of the flat upper surface of the central ledge are conterminous.
- A vertical height of the upper surface of each of the parallel opposed top side rails is disposed below a vertical height of the substantially flat upper surface of the central ledge by a vertical distance that is equal to a thickness of the forward end of the horizontal portion of each of the pair of corner members.
- Each of the pair of corner members further comprises a depending vertical skirt on an inboard side of the horizontal portion of each of the pair of corner members.
- The depending vertical skirt on the inboard side of the horizontal portion of each of the pair of corner members comprises a cutout disposed proximate the forward end of the horizontal portion.
- The cutout on the depending vertical skirt of the inboard side of the horizontal portion of the pair of corner members corresponds to a horizontal profile of the central ledge.
- Each of the pair of corner members further comprises an upwardly extending vertical portion proximate the forward end of the horizontal portion.
- The vertical portion of each of the pair of corner members has a first vertical surface extending upwardly from the forward end of the horizontal portion of each of the pair of corner members.
- The vertical portion has a second vertical surface disposed substantially orthogonally to the first vertical surface.
- Each of the pair of corner members comprises a depending vertical skirt on each side of the each of pair of corner members, and the second vertical surface is continuous with an outboard one of the vertical skirts on each of the pair of corner members.
- A portion of each of the pair of corner members defines a curvilinear transition between the horizontal portion and the vertical portion of each of the pair of corner members.
- The vertical portion of each of the pair of corner members further comprises a plurality of fasteners for attachment of the pair of corner members to the unibody motor vehicle.
- A pair of rail members each extending substantially over a length of one of the pair of parallel opposed top side rails.
- The pair of rail members each further comprises a depending vertical skirt on each side and a vertical recess disposed on an inboard one of each of the vertical skirts of the pair of rail members proximate a rearward end of the pair of rail members adapted to receive an upper side edge of a movable tailgate affixed to a rear portion of the truck cargo box to form a substantially continuous flat surface about a perimeter of the truck cargo box.

According to another aspect of the present invention, a continuous sealing flat for a truck cargo box for a unibody motor vehicle includes a pair of parallel opposed side walls defining a pair of parallel opposed top side rails and a cab back panel disposed between and orthogonally to the pair of parallel opposed side walls, wherein the cab back panel comprises a central portion having a central ledge having a substantially flat upper surface extending horizontally between and at a vertical height above a vertical height of an upper surface of each of the pair of parallel opposed top side rails. A pair of injection-molded corner members each having a rearward end of a horizontal portion is disposed over and proximate a forward end of each of the parallel opposed top side rails, wherein a forward end of the horizontal portion of each of the pair of corner members is disposed proximate to and comprises a flat upper surface at substantially the same vertical height as a height of the flat upper surface of the central ledge. A pair of injection-molded rail members extends substantially over and is mounted to a length of one of the pair of parallel opposed top side rails to form a substantially continuous flat upper surface about the forward and side portions of the truck cargo box.

Embodiments of the second aspect of the present disclosure can include any one or a combination of the following features:

The pair of rail members each further comprises a depending vertical skirt on each side.

A rearward end of the horizontal portion of each of the pair of corner members has a notched relief upon which is received and mates with a forward end of the rail member having a thickness corresponding to the notched relief to form a substantially continuous flat surface about a perimeter of the truck cargo box.

According to yet another aspect of the present invention, a method is disclosed for forming a continuous sealing flat for a truck cargo box of a unibody motor vehicle. The method comprising the steps of:
  forming a pair of parallel opposed side walls to define a pair of parallel opposed top side rails each having an upper surface;
  forming a cab back panel having a central portion comprising a central ledge, a pair of opposed distal ends, and an end cap disposed at each distal end of the central portion of the cab back panel, wherein the central ledge has a substantially flat upper surface extending horizontally between the pair of opposed distal ends;
  joining the pair of parallel opposed side walls and the cab back panel through the end cap disposed at each distal end of the central portion of the cab back panel, wherein the cab back panel is disposed between and orthogonally to the pair of parallel opposed top side rails and the substantially flat upper surface of the central portion of the central ledge is at a vertical height above a vertical height of an upper surface of each of the parallel opposed top side rails; and
  mounting a pair of corner members each having a horizontal portion comprising a flat upper surface over and proximate a forward end of each of the parallel opposed top side rails, wherein the flat upper surface of a forward end of the horizontal portion of each of the pair of corner members is disposed above the end cap disposed at each distal end of the cab back panel and the flat upper surface of each of the pair of corner members is at substantially the same vertical height as a vertical height of the flat upper surface of the central ledge to form a substantially continuous corner flat upper surface.

Embodiments of the third aspect of the present disclosure can include any one or a combination of the following features:

The step of mounting a pair of rail members above and extending substantially over a length of each of the pair of parallel opposed top side rails to form a substantially continuously sealing flat about a forward portion and a side portion of a perimeter of the truck cargo box.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 9 is a rear side perspective view of the central portion of the cab back panel of the continuous sealing flat in accordance with the present disclosure depicted in FIG. 1;

FIG. 10 is a rear side perspective view of one of the end caps of the cab back panel of the continuous sealing flat in accordance with the present disclosure depicted in FIG. 1;

FIG. 11 is a side view of the cab back panel of the continuous sealing flat in accordance with the present disclosure depicted in FIG. 1, taken along the line XI-XI in FIG. 9;

FIG. 12 is a side view of one of one of the end caps of the cab back panel of the continuous sealing flat in accordance with the present disclosure depicted in FIG. 1, taken along the line XII-XII in FIG. 10;

FIG. 13 is a rear side perspective view of one of the pair of the rail members of the continuous sealing flat in accordance with the present disclosure depicted in FIG. 1; and FIG. 14 is an enlarged rear side perspective view of a rearward end one of the pair of the rail members of the continuous sealing flat in accordance with the present disclosure depicted in FIG. 1, taken along the line XIV-XIV in FIG. 13.

DETAILED DESCRIPTION OF THE PREFERRED EMBODIMENTS

Figure 1:
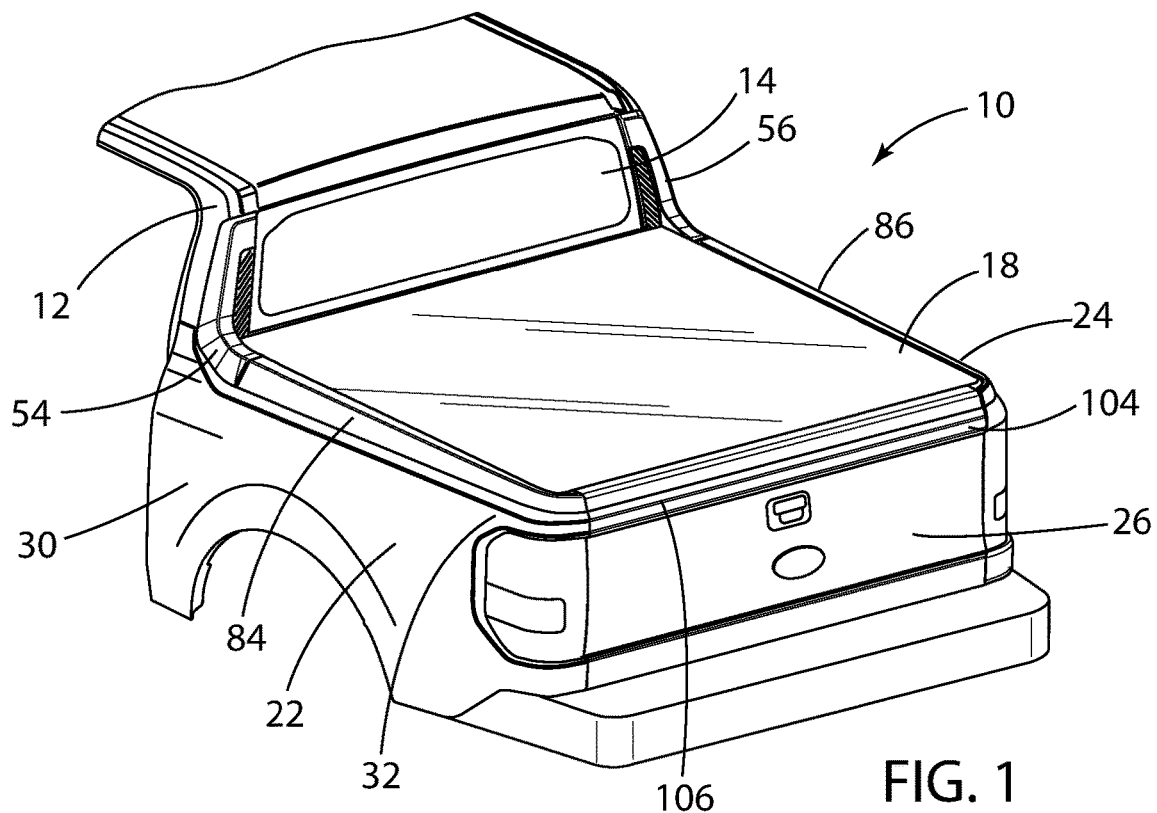
FIG. 1 is a rear side perspective view of a unibody motor vehicle equipped with a truck cargo box and the continuous sealing flat in accordance with the present disclosure, with a tonneau cover installed.

For purposes of description herein, the terms "upper," "lower," "right," "left," "rear," "front," "rearward," "forward," "inboard," "outboard," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
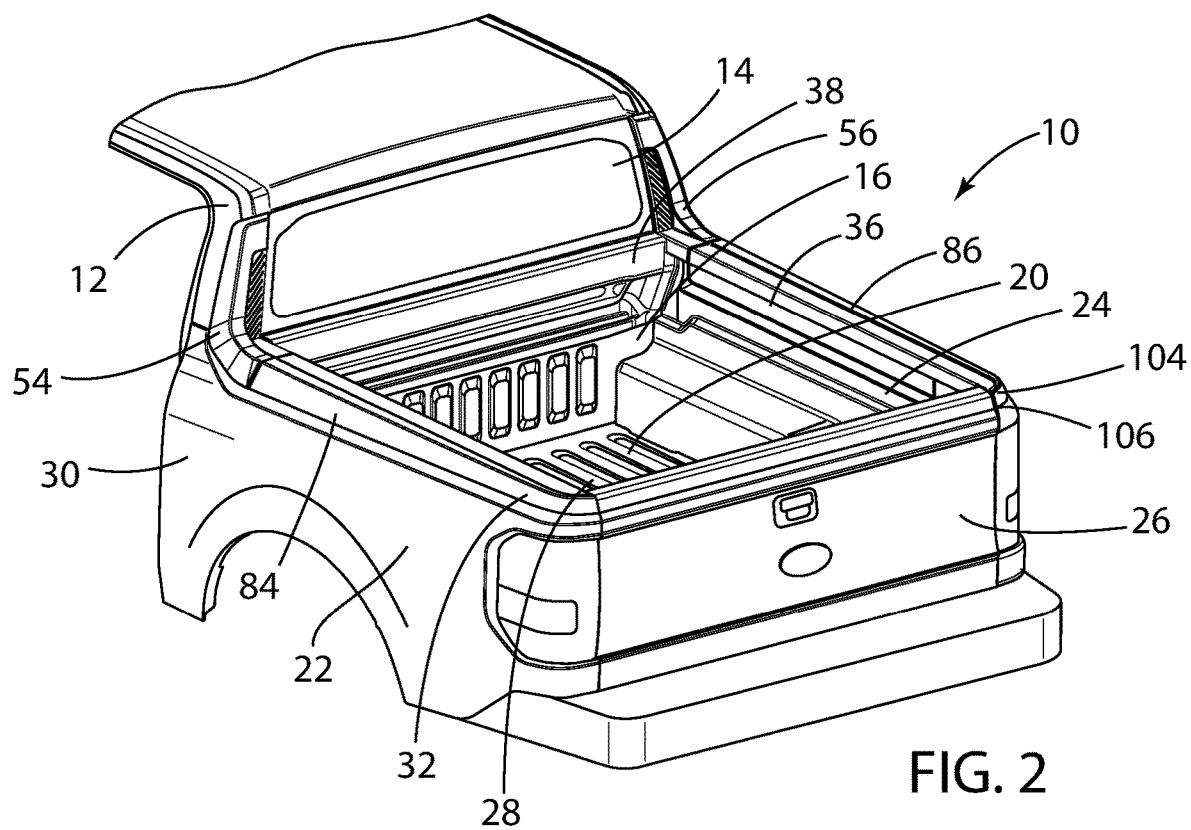
FIG. 2 is a rear side perspective view of a unibody motor vehicle equipped with a truck cargo box and the continuous sealing flat in accordance with the present disclosure depicted in FIG. 1, with the tonneau cover removed.

Referring to FIGS. 1 and 2, reference numeral 10 generally designates a unibody motor vehicle, such a pickup truck, which is provided with a cab 12 within which occupants may be seated. As is known, the cab 12 may include, inter alia, a rear window assembly 14 and a cab back panel 16 disposed at the rearward portion of the cab 12. A truck cargo box 20 is located further rearward of the cab 12 within which cargo and other items may be transported.

As shown, as a unibody motor vehicle 10, the truck cargo box 20 is fabricated as an integrated structure with the cab 12, which shares with the truck cargo box 20 the cab back panel 16. That is, the cab back panel 16 also serves as the forward bulkhead of the truck cargo box 20. A pair of parallel opposed truck cargo box side walls 22, 24 extend rearwardly from the cab back panel 16. A moveable and pivotable tailgate 26 may be attached at a rearward end 28 of the truck cargo box 20 to form the truck cargo box 20 having a generally rectangular shape.

As shown in FIGS. 2-6, 9, and 11, the cab back panel 16 is disposed between and orthogonally to the pair of parallel opposed truck cargo box side walls 22, 24, each of which has a forward end 30, a rearward end 32, and a top rail portion defining a pair of parallel opposed top side rails 34, 36. The cab back panel 16 further is provided with a central ledge 38 having a substantially flat upper surface 40 extending horizontally between and at a vertical height slightly above a vertical height of an upper surface 42 of each of the pair of parallel opposed top side rails 34, 36, as perhaps best shown in FIG. 5. The flat upper surface 40 of the central ledge 38 has a forward edge 44, as shown in FIG. 11. The cab back panel 16 is further provided with a vertical lip 46 extending upwardly from the forward edge 44 of the flat upper surface 40 of the central ledge 38, also shown in FIG. 11.

The cab back panel 16, which may be fabricated from a suitable metal, such as an aluminum alloy, may formed from a central portion 48 having a pair of opposed distal ends 50, where the central portion 48 is provided with the central ledge 38 upon which the flat upper surface 40 is formed, and an end cap 52 disposed at each distal end 50 of the central portion 48 of the cab back panel 16. The central portion 48 and the end caps 52 may be separately stamped or drawn as discrete components, and thereafter welded together, as shown in FIGS. 9-12. As shown in FIGS. 9 and 11, flat upper surface 40 of the central ledge 38 of the central portion 48 defines a substantially flat upper surface extending horizontally between the pair of opposed distal ends 50.

Figure 5:
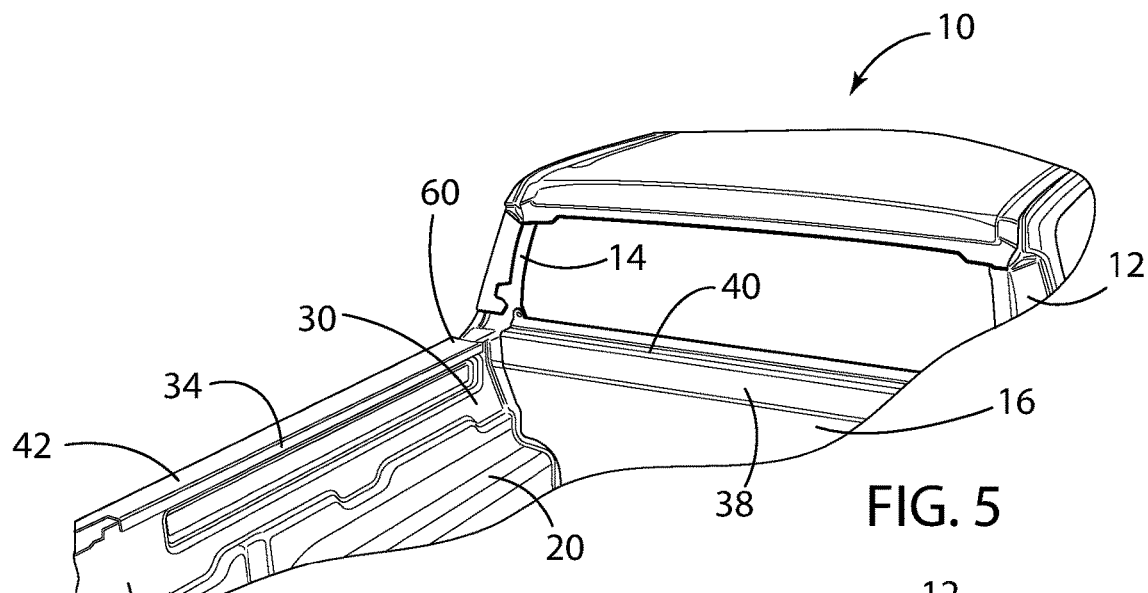
FIG. 5 is a rear side perspective view of the cab back panel and the pair of parallel opposed top side rails adapted for use with the continuous sealing flat in accordance with the present disclosure depicted in FIG. 1.

As shown in FIG. 5, the pair of parallel opposed side walls 22, 24 and the cab back panel 16, through the end cap 52 disposed at each distal end 50 of the central portion 48 of the cab back panel 16, may be joined to the unibody motor vehicle 10, such as through welding processes. The cab back panel 16 is thus disposed between and orthogonally to the pair of parallel opposed top side rails 34, 36, with the flat upper surface 40 of the central ledge 38 is at a vertical height slightly above a vertical height of an upper surface 42 of each of the parallel opposed top side rails 34. 36, as further discussed below.

A pair of corner members 54, 56, each having a horizontal portion 58, are disposed over and mounted proximate a forward end 60 of each of the parallel opposed top side rails 34, 36, such that the horizontal portion 58 of the pair of corner members 54, 56 may be disposed over and proximate the forward end 60 of each of the parallel opposed top side rails 34, 36. A forward end 62 of the horizontal portion 58 of each of the pair of corner members 54, 56 may further be disposed above the end cap 52 disposed at each distal end 50 of the cab back panel 16. The forward end 62 of the horizontal portion 50 of each of the pair of corner members 54, 56 may be disposed proximate to the flat upper surface 40 of the central ledge 38.

A flat upper surface 64 of the forward end 62 of the horizontal portion 58 of each of the pair of corner members 54, 56 so situated may be thereby disposed at substantially the same vertical height as the flat upper surface 40 of the central ledge 38. That is, the vertical height of the upper surface 42 of each of the parallel opposed top side rails 34, 36 may be disposed below the vertical height of the substantially flat upper surface 40 of the central ledge 38 by a vertical distance that is equal to a thickness T of the forward end 62 of the horizontal portion 58 of each of the pair of corner members 54, 56. Since the flat upper surface 64 of the forward end 62 of the horizontal portion 58 of each of the pair of corner members 54, 56 is at substantially the same vertical height as the flat upper surface 40 of the central ledge 38, a substantially continuous corner flat surface is formed, as perhaps best shown in FIG. 6.

Figure 7:
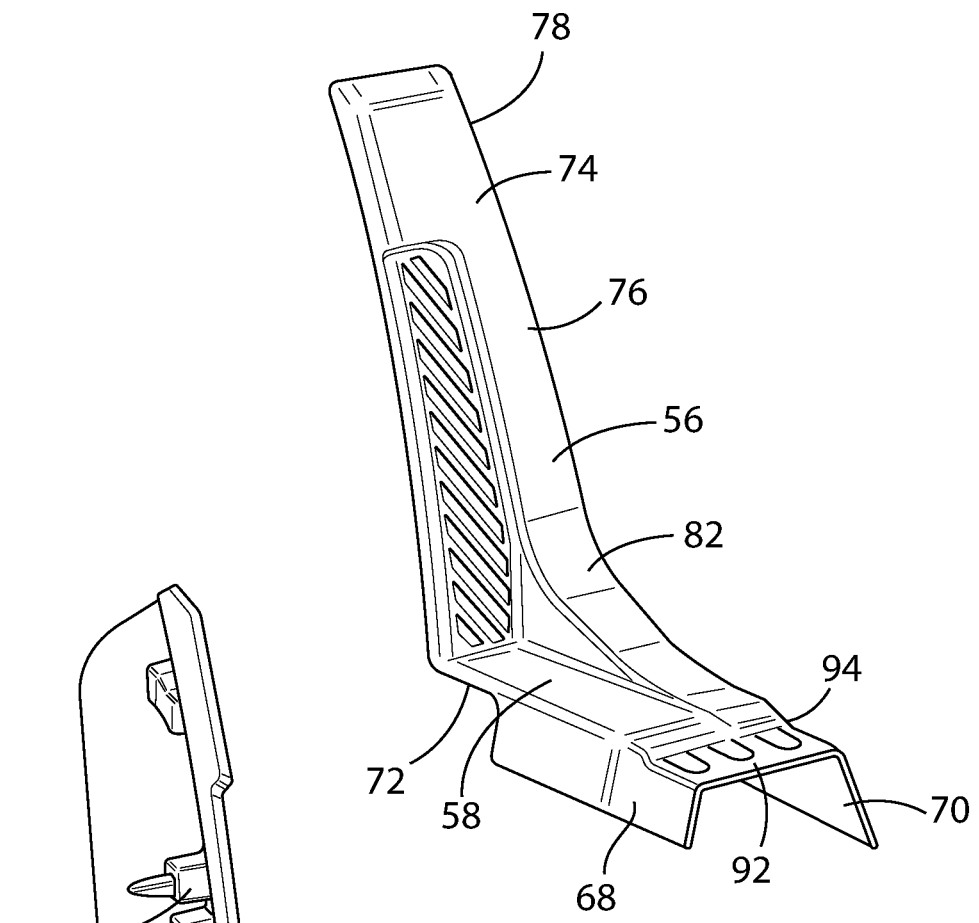
FIG. 7 is a rear side perspective view of one of the pair of cover members of the continuous sealing flat in accordance with the present disclosure depicted in FIG. 1.

The forward end 62 of the horizontal portion 58 of the pair of corner members 54, 56 may include a forward edge 66 disposed proximate the forward edge 44 of the flat upper surface 40 of the central ledge 38, such that the forward edge 66 of the pair of corner members 54, 56 and the forward edge 44 of the flat upper surface 40 of the central ledge 38 are conterminous. Each of the pair of corner members 54, 56 may also include a depending vertical skirt 68 on at least an inboard side of the horizontal portion 58 of the pair of corner members 54, 56. Each of the pair of corner members 54, 56 may further include a depending vertical skirt 70 on an outboard side of the pair of corner members 54, 56, as shown in FIG. 7. The inboard vertical skirt 68 of the horizontal portion 58 of the pair of corner members 54, 56 may include a cutout 72 disposed proximate the forward end 62 of the horizontal portion 58 of the pair of corner members 54, 56, also shown in FIG. 7. The cutout 72 on the inboard vertical skirt 68 of the horizontal portion 58 of the pair of corner members 54, 56 may be shaped to correspond to a horizontal profile P of the central ledge 38 of the central portion 48 of the cab back panel 16, as shown in FIG. 11.

Figure 3:
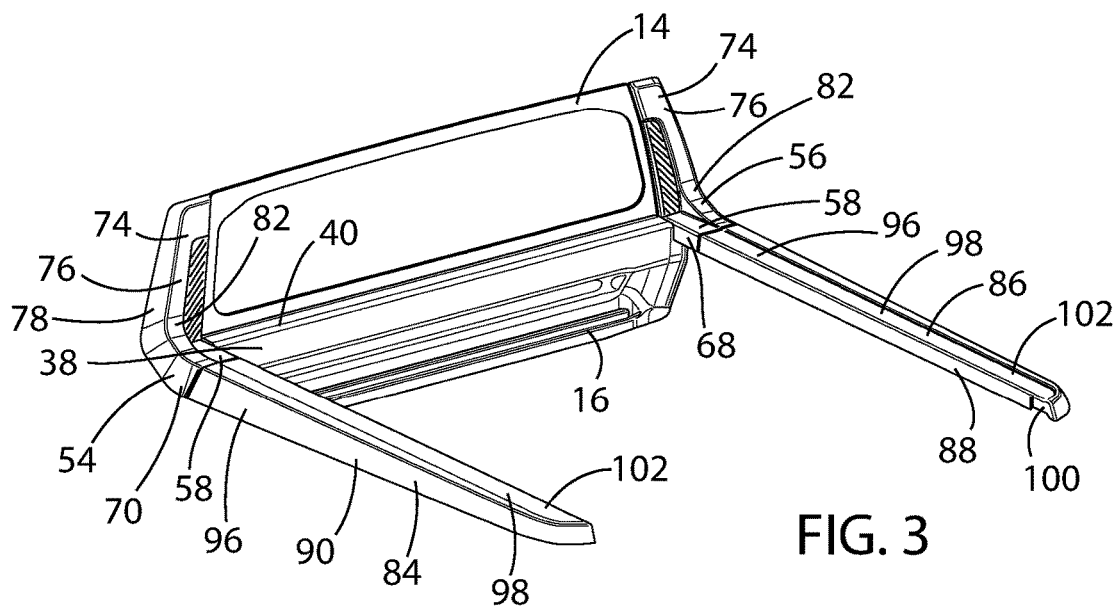
FIG. 3 is a rear side perspective view of the continuous sealing flat in accordance with the present disclosure depicted in FIG. 1.
Figure 8:
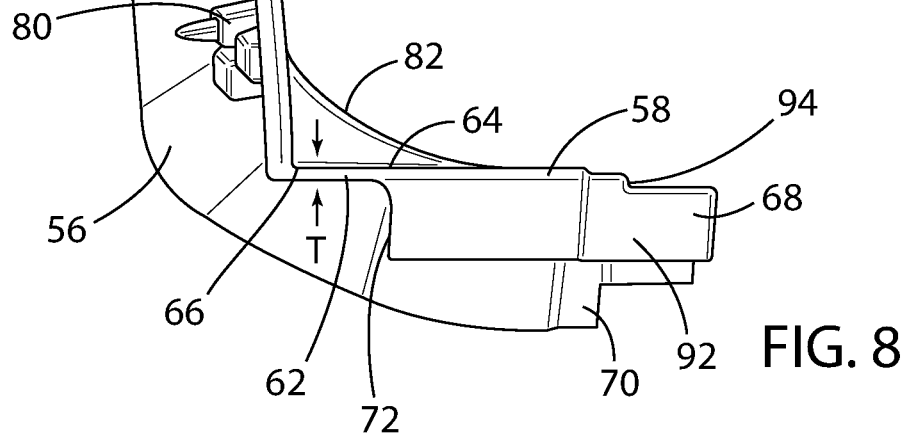
FIG. 8 is an inboard side view of one of the pair of cover members of the continuous sealing flat in accordance with the present disclosure depicted in FIG. 1.

As shown in FIGS. 7 and 8, each of the pair of corner members 54, 56 may further include an upward extending vertical portion 74 proximate the forward end 62 of the horizontal portion 58. The vertical portion 74 of each of the pair of corner members 54, 56 has a first vertical surface 76 extending upwardly from the forward end 62 of the horizontal portion 58 of the pair of corner members 54, 56 and a second vertical surface 78 disposed substantially orthogonally to the first vertical surface 76. As shown in FIG. 3, the second vertical surface 78 may be continuous with the outboard vertical skirt 70 on the pair of corner members 54, 56. The vertical portion 74 of each of the pair of corner members 54, 56 may be provided with a plurality of fasteners 80, such as bayonet fasteners, for attaching the pair of corner members 54, 56 to the unibody motor vehicle 10 proximate the rear window assembly 14 of the cab 12. In addition, a portion 82 of the pair of corner members 54, 56 may define a curvilinear transition between the horizontal portion 58 and the vertical portion 74 of the pair of corner members 54, 56. Of course, other shapes and configurations for the pair of corner members 54, 56 may be adopted, and the pair of corner members 54, 56 may be utilized as one of the trim pieces for developing the aesthetic qualities of and to obtain a desired studio fit and finish for the unibody motor vehicle 10.

Figure 4:
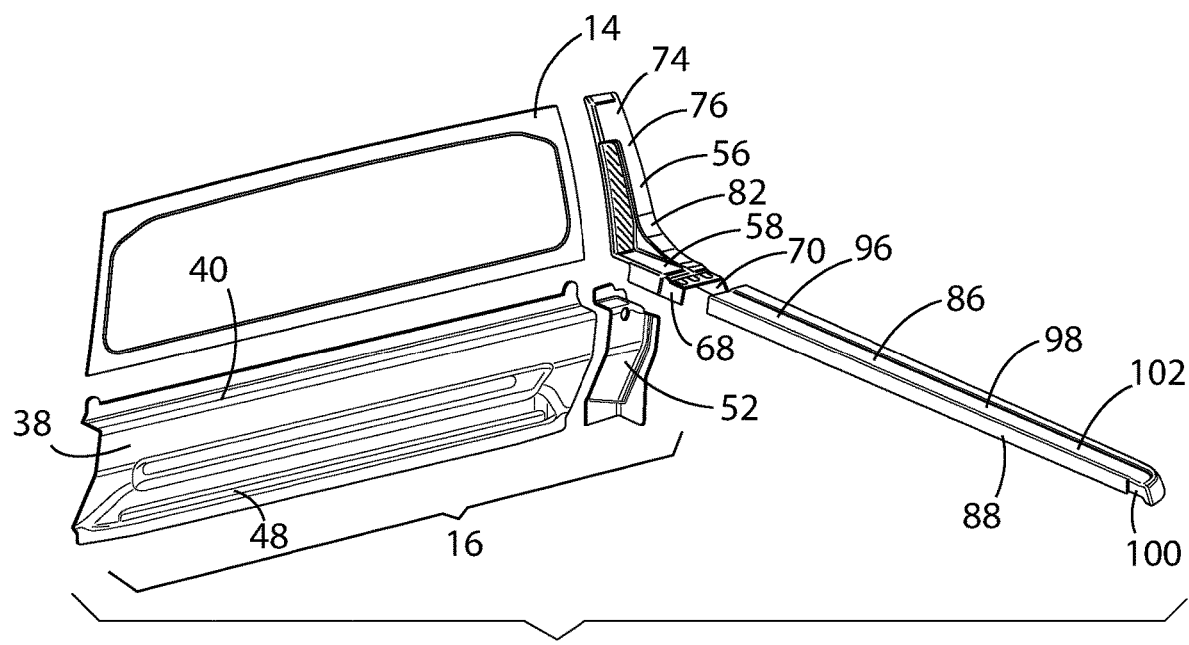
FIG. 4 is a rear side perspective exploded view of the continuous sealing flat in accordance with the present disclosure depicted in FIG. 1.
Figure 6:
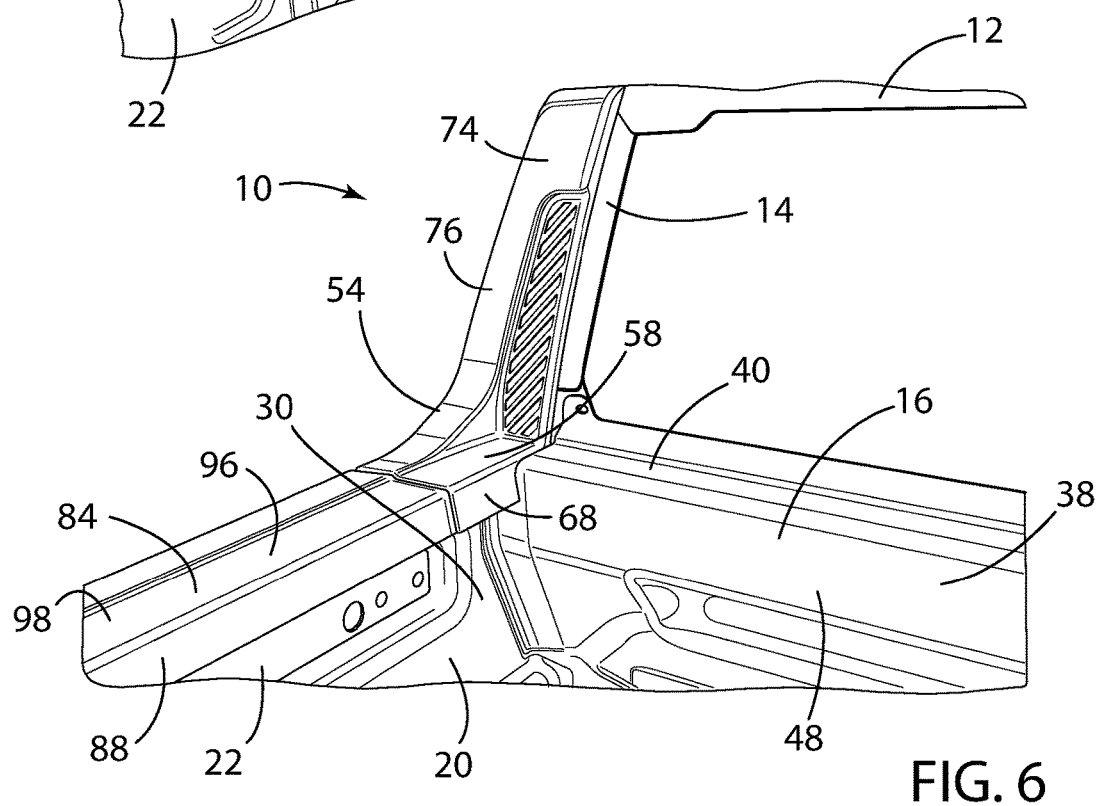
FIG. 6 is a rear side perspective view of the cab back panel, one of the pair of cover members, and one of the pair of rail members each extending substantially over a length of one of the pair of parallel opposed top side rails of the continuous sealing flat in accordance with the present disclosure depicted in FIG. 1.

The continuous sealing flat may also include a pair of rail members 84, 86, each one mounted to and extending substantially over the length of one of the pair of parallel opposed top side rails 34, 36. The pair of rail members 84, 86 may each further include a depending inboard and outboard vertical skirt 88, 90 on each side of an upper surface that corresponds to the depending vertical skirts 68, 70 on each side of the pair of corner members 54, 56, as can be seen in FIGS. 4 and 6. In addition, a rearward end 92 of the horizontal portion 58 of the pair of corner members 54, 56 may have a notched relief 94 upon which is received and mates with a forward end 96 of the rail members 84, 86 having a thickness corresponding to the notched relief 94 to form a substantially continuous flat surface between the upper surface 64 of the horizontal portion 58 of the pair of corner members 54, 56, and the upper surface 98 of the pair of rail members 84, 86. So configured, the substantially flat upper surface 40 of the central ledge 38, the upper surface 64 of the horizontal portion 58 of the pair of corner members 54, 56, and the upper surface 98 of the pair of rail members 84, 86 form a substantially continuous flat upper surface about the forward and side portions of the truck cargo box 20.

A further feature includes a vertical recess 100 disposed on the inboard vertical skirt 88 of the pair of rail members 84, 86 proximate a rearward end 102 of the pair of rail members 84, 86. The vertical recess 100 is provided to receive an upper side edge 104 of the movable tailgate 26 affixed to the rearward end 28 of the truck cargo box 20 to form a substantially continuous flat upper surface about the entire perimeter of the truck cargo box 20.

Once assembled, a substantially continuous flat upper surface about the perimeter of the truck cargo box 20 is defined by the substantially flat upper surface 40 of the central ledge 38, the upper surface 64 of the horizontal portion 58 of the pair of corner members 54, 56, the upper surface 98 of the pair of rail members 84, 86, and an upper surface 106 of the movable tailgate 26. This configuration provides a surface against which a cover 18 for the truck cargo box 20, such as a tonneau cover shown in FIG. 2, may be mounted and brought into sealing engagement to protect the truck cargo box 20 and its contents from the elements by sealing against water and dust, without resorting to a drop-in cargo box liner, bolt-on rails, or other accessories.

The pair of corner members 54, 56 and the pair of rail members 84, 86 may be injection molded by any conventional injection-molding process. Each of the pair of corner members 54, 56 and the pair of rail members 84, 86 also may be injection-molded as a single piece from any suitable material, such as rigid thermoplastic polyolefin elastomer (TPO) or other suitable polymer. In addition, by virtue of the injection-molding process, the pair of corner members 54, 56 and the pair of rail members 84, 86 may be formed in virtually any color, finish, and styling configuration in order to obtain a desired studio fit and finish for the unibody motor vehicle 10. Moreover, use of the injection-molding process for the pair of corner members 54, 56 and the pair of rail members 84, 86 allows a consistent flat surface for the cover 18 for the truck cargo box 20, such as the tonneau cover, upon which to sit.

To the extent that any gaps remain between the substantially flat upper surface 40 of the central ledge 38, the upper surface 64 of the horizontal portion 58 of the pair of corner members 54, 56, and the upper surface 98 of the pair of rail members 84, 86, a suitable polymeric or silicone sealant may be applied to minimize or eliminate such gaps and further seal the continuous sealing flat. In addition, it is contemplated that the cover 18 for the truck cargo box 20, such as the tonneau cover, is provided with a resilient sealing member (not shown) disposed about its bottom perimeter to further seal the truck cargo box 20.

The disclosure presented above thus offers an elegant solution to the challenges of sealing the truck cargo box 20 against water and dust and requires little extra parts or cost, particularly compared to existing solutions.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A continuous sealing flat for a truck cargo box for a unibody motor vehicle comprising:
   a pair of parallel opposed top side rails;
   a cab back panel disposed between and orthogonally to the pair of parallel opposed top side rails, wherein the cab back panel comprises a central portion having a central ledge having a substantially flat upper surface extending horizontally between an upper surface of each of the pair of parallel opposed top side rails; and
   a pair of corner members each having a rearward end of a horizontal portion disposed over and proximate a forward end of each of the parallel opposed top side rails, wherein a forward end of the horizontal portion of each of the pair of corner members comprises a flat upper surface disposed proximate to and at substantially the same vertical height as a vertical height of the flat upper surface of the central ledge to form a substantially continuous corner flat upper surface.

2. The continuous sealing flat of claim 1, wherein the flat upper surface of the central ledge has a forward edge and the flat upper surface of the forward end of the horizontal portion of each of the pair of corner members further comprises a forward edge disposed proximate the forward edge of the flat upper surface of the central ledge.

3. The continuous sealing flat of claim 2, wherein the cab back panel further comprises a vertical lip extending upwardly from the forward edge of the flat upper surface of the central ledge and the forward edge of each of the pair of corner members and the forward edge of the flat upper surface of the central ledge are conterminous.

4. The continuous sealing flat of claim 2, wherein a vertical height of the upper surface of each of the parallel opposed top side rails is disposed below a vertical height of the substantially flat upper surface of the central ledge by a vertical distance that is equal to a thickness of the forward end of the horizontal portion of each of the pair of corner members.

5. The continuous sealing flat of claim 1, wherein each of the pair of corner members further comprises a depending vertical skirt on an inboard side of the horizontal portion of the pair of corner members.

6. The continuous sealing flat of claim 5, wherein the depending vertical skirt on the inboard side of the horizontal portion of each of the pair of corner members comprises a cutout disposed proximate the forward end of the horizontal portion.

7. The continuous sealing flat of claim 6, wherein the cutout on the depending vertical skirt of the inboard side of the horizontal portion of each of the pair of corner members corresponds to a horizontal profile of the central ledge.

8. The continuous sealing flat of claim 1, wherein each of the pair of corner members further comprises an upwardly extending vertical portion proximate the forward end of the horizontal portion.

9. The continuous sealing flat of claim 8, wherein the vertical portion of each of the pair of corner members has a first vertical surface extending upwardly from the forward end of the horizontal portion of each of the pair of corner members.

10. The continuous sealing flat of claim 9, wherein the vertical portion has a second vertical surface disposed substantially orthogonally to the first vertical surface.

11. The continuous sealing flat of claim 10, wherein each of the pair of corner members further comprises a depending vertical skirt on each side of the pair of corner members, and the second vertical surface is continuous with an outboard one of the vertical skirts on each side of each of the pair of corner members.

12. The continuous sealing flat of claim 8, wherein a portion of each of the pair of corner members defines a curvilinear transition between the horizontal portion and the vertical portion of each of the pair of corner members.

13. The continuous sealing flat of claim 8, wherein the vertical portion of each of the pair of corner members further comprises a plurality of fasteners for attachment of each of the pair of corner members to the unibody motor vehicle.

14. The continuous sealing flat of claim 1, further comprising a pair of rail members each extending substantially over a length of one of the pair of parallel opposed top side rails.

15. The continuous sealing flat of claim 14, wherein the pair of rail members each further comprises:
   a depending vertical skirt on each side; and
   a vertical recess disposed on an inboard one of each of the vertical skirts on each side of the pair of rail members proximate a rearward end of the pair of rail members adapted to receive an upper side edge of a movable tailgate affixed to a rear portion of the truck cargo box to form a substantially continuous flat surface about a perimeter of the truck cargo box.

16. A continuous sealing flat for a truck cargo box for a unibody motor vehicle comprising:
   a pair of parallel opposed side walls defining a pair of parallel opposed top side rails;
   a cab back panel disposed between and orthogonally to the pair of parallel opposed side walls, wherein the cab back panel comprises a central portion having a central ledge having a substantially flat upper surface extending horizontally between and at a vertical height above a vertical height of an upper surface of each of the pair of parallel opposed top side rails;

a pair of injection-molded corner members each having a rearward end of a horizontal portion disposed over and proximate a forward end of each of the parallel opposed top side rails, wherein a forward end of the horizontal portion of each of the pair of corner members is disposed proximate to and comprises a flat upper surface at substantially the same vertical height as a vertical height of the flat upper surface of the central ledge; and a pair of injection-molded rail members each extending substantially over and mounted to a length of one of the pair of parallel opposed top side rails to form a substantially continuous flat upper surface about a forward portion and a pair of side portions of the truck cargo box.

17. The continuous sealing flat of claim 16, wherein the pair of rail members each further comprises a depending vertical skirt on each side.

18. The continuous sealing flat of claim 16, wherein a rearward end of the horizontal portion of each of the pair of corner members has a notched relief upon which is received and mates with a forward end of the rail member having a thickness corresponding to the notched relief to form a substantially continuous flat surface about a perimeter of the truck cargo box.

19. A method for forming a continuous sealing flat for a truck cargo box of a unibody motor vehicle, the method comprising the steps of:

forming a pair of parallel opposed side walls to define a pair of parallel opposed top side rails each having an upper surface;

forming a cab back panel having a central portion comprising a central ledge, a pair of opposed distal ends, and an end cap disposed at each distal end of the central portion of the cab back panel, wherein the central ledge has a substantially flat upper surface extending horizontally between the pair of opposed distal ends;

joining the pair of parallel opposed side walls and the cab back panel through the end cap disposed at each distal end of the central portion of the cab back panel, wherein the cab back panel is disposed between and orthogonally to the pair of parallel opposed top side rails and the substantially flat upper surface of the central portion of the central ledge is at a vertical height above a vertical height of an upper surface of each of the parallel opposed top side rails; and mounting a pair of corner members each having a horizontal portion comprising a flat upper surface over and proximate a forward end of each of the parallel opposed top side rails, wherein the flat upper surface of a forward end of the horizontal portion of each of the pair of corner members is disposed above the end cap disposed at each distal end of the cab back panel and the flat upper surface of each of the pair of corner members is at substantially the same vertical height as a vertical height of the flat upper surface of the central ledge to form a substantially continuous corner flat upper surface.

20. The method for forming a continuous sealing flat of claim 19, further comprising the step of mounting a pair of rail members above and extending substantially over a length of each of the pair of parallel opposed top side rails to form a substantially continuously sealing flat about a forward portion and a side portion of a perimeter of the truck cargo box.

* * * * *